(12) United States Patent
Sharping et al.

(10) Patent No.: US 7,898,731 B2
(45) Date of Patent: Mar. 1, 2011

(54) FIBER OPTICAL PARAMETRIC OSCILLATOR WITH HIGH POWER AND BANDWIDTH

(75) Inventors: Jay E. Sharping, Turlock, CA (US); Mark Foster, Ithaca, NY (US); Alexander Gaeta, Ithaca, NY (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/275,183

(22) Filed: Nov. 20, 2008

(65) Prior Publication Data

US 2009/0141340 A1 Jun. 4, 2009

Related U.S. Application Data

(60) Provisional application No. 60/989,344, filed on Nov. 20, 2007.

(51) Int. Cl.
*G02F 1/39* (2006.01)
*G02F 1/365* (2006.01)
*H01S 3/067* (2006.01)

(52) U.S. Cl. .................. 359/330; 359/341.1; 372/22

(58) Field of Classification Search ......... 359/326–332, 359/341.1, 341.3; 372/21–22
See application file for complete search history.

(56) References Cited

U.S. PATENT DOCUMENTS

| 3,875,422 | A | * | 4/1975 | Stolen | 359/330 |
| 4,784,450 | A | * | 11/1988 | Jain et al. | 359/332 |
| 6,958,855 | B2 | * | 10/2005 | Kumar et al. | 359/330 |
| 2003/0031411 | A1 | * | 2/2003 | Arbore et al. | 385/37 |
| 2005/0238070 | A1 | * | 10/2005 | Imeshev et al. | 372/21 |
| 2008/0267228 | A1 | * | 10/2008 | Sacks et al. | 372/6 |

OTHER PUBLICATIONS

Deng et al., "Broadly tunable femtosecond parametric oscillator using a photonic crystal fiber," 2005, Optic Letters, vol. 30, No. 10, 1234-1236.

Harvey et al., "Scalar modulation instability in the normal dispersion regime by use of a photonic crystal fiber," 2003, Optics Letters, vol. 28, No. 22, 2225-2227.

(Continued)

*Primary Examiner*—Daniel Petkovsek
(74) *Attorney, Agent, or Firm*—Kilpatrick Townsend & Stockton LLP; David B. Raczkowski

(57) ABSTRACT

The present invention provides methods, systems, and apparatus of improved fiber-based optical parametric oscillators (FOPOs). These oscillators can be used in the creation of short pulsed laser radiation, which are useful in numerous applications, such as characterization of materials and molecules. A relationship between fiber length and performance is realized, where shorter lengths counterintuitively provide greater power and width of output bands. This relationship is used to develop improved FOPOs. For example, fibers of 10 cm or less may be used to obtain superior performance in terms of wavelength tunability (e.g. bandwidth of 200 nm and greater) and output power (e.g. pulse power of 1 nJ). Other realized relationships between length and wavelength position of output bands are also used to select the wavelength range output from the FOPO. The diameter of the fiber may be selected to provide positioning (e.g. a centering) of the range of attainable output wavelengths.

20 Claims, 12 Drawing Sheets

OTHER PUBLICATIONS

Li et al., "Widely Tunable Femtosecond Fiber Optical Parametric Oscillator," 2006, Optics Communications, 267, 491-497.

Margulis et al., "Four-photon fiber laser," 1987, Optics Letters, vol. 12, No. 7, 519-521.

Marhic et al., "Broadband fiber optical parametric amplifiers," 1996, Optics Letters, vol. 21, No. 8, 573-575.

Sharping et al., "Octave-spanning, high-power microstructure-fiber-based optical parametric oscillators," Feb. 2007, Optics Express, vol. 15, No. 4, 1474-1479.

Teipel et al, "Tapered Fiber Femtosecond Optical Parametric Oscillator," Optical Society of America, CLEO Paper, Baltimore, (2003).

* cited by examiner

FIBER OPTICAL PARAMETRIC OSCILLATOR WITH HIGH POWER AND BANDWIDTH

CROSS REFERENCE TO RELATED APPLICATIONS

The present application claims priority from and is a non provisional application of U.S. Provisional Application No. 60/989,344, entitled "SHORT PULSE FIBER OPTICAL PARAMETRIC OSCILLATOR" filed Nov. 20, 2007, the entire contents of which are herein incorporated by reference for all purposes.

BACKGROUND

The present invention relates generally to lasers, and more specifically to ultrafast, high energy, and wavelength tunable pulsed light sources, particularly with fiber-based lasers.

Solid-state lasers combined with optical parametric oscillators (OPOs) based on $\chi^{(2)}$ crystals are the current state-of-the-art for generating short pulsed laser radiation. They are most often used to generate a single, wavelength-tunable pulse train, but they are instrumental for the generation of synchronous trains of pulses operating at separated wavelengths. These synchronous pulse trains are useful in pump-probe measurements such as probing the carrier lifetimes in semiconductors, spectroscopically resolving fast chemical or biological reactions, and in any setting where multi-photon excitation is used.

The simplest synchronous systems have two stages, for example one can use two synchronized Ti:Sapphire oscillators or a wavelength tunable OPO that is pumped by a single Ti:Sapphire oscillator. Greater flexibility is achieved through greater complexity. One can use a multi-stage amplified Ti:Sapphire system and an optical parametric amplifier. The realization that ultrafast pulsed lasers can provide unique capability is resulting in a growing need for wavelength tunable pulsed sources of light at wavelengths where many biological materials have increased transparency. This window ranges in wavelength from about 900 nm up to 1500 nm, and it is not easily covered by Ti:Sapphire-based systems unless more than two stages are used, which increases manufacturing and operating time and cost.

Although commercial bulk optical systems are becoming more compact and user friendly, they are still quite expensive and there has been a trend towards using ultrafast fiber lasers. Bulk systems are currently superior to fiber lasers with the principal drawbacks of fiber lasers being limited wavelength tunability (e.g. a narrow range of available output wavelengths) and pulse duration flexibility (e.g. narrow range of pulse widths).

Therefore, it is desirable to provide inexpensive lasers with high power, wavelength tunability, and pulse duration flexibility.

BRIEF SUMMARY

Embodiments of the present invention provide methods, systems, and apparatus for improving fiber-based optical parametric oscillators (FOPOs). These oscillators can be used in the creation of short pulsed laser radiation, which are useful in numerous applications, such as characterization of materials and molecules.

In one aspect, embodiments realize a relationship between fiber length and performance, where shorter lengths counter-intuitively provide greater power and width of output bands (termed bandwidth). Thus, embodiments overcome limitations in the standard fiber lasers with regard to the OPOs employed. Fibers of 10 cm or less may be used to obtain superior performance in terms of wavelength tunability (e.g. bandwidth of 200 nm and greater) and output power (e.g. pulse power of 1 nJ).

In another aspect, embodiments realize a relationship between length and the wavelength position of the output bands from the FOPO. Embodiments use this relationship to select the range of wavelengths that are output from the FOPO. In addition, the diameter of the fiber in the FOPO may be selected to provide a positioning (e.g. a centering) of the range of wavelengths that are output. Thus, embodiments provide specialized FOPOs with particular desired properties and methods for making these FOPOs.

As used herein, an "optical parametric oscillator" is a laser-like system that combines parametric gain with optical feedback. Parametric gain implies that energy is coupled into one or more desired optical beams at the expense of one or more other optical beams. Unlike a normal laser, the total energy of the beams is conserved (no energy is lost), and the coupling is controlled, or "parameterized", by the amplitudes and phases of the beams that are involved. Oscillation implies that the beams undergo multiple passes through the parametric gain. As used herein, the term "fiber-based gain medium" is a piece of fiber in which the beam travels and undergoes the parametric gain. Some embodiments of the present invention use microstructure fibers (MFs), often called photonic crystal fibers, which has resulted in the availability of optical fibers featuring a huge range of dispersive properties and nonlinear coefficients.

According to one exemplary embodiment, a fiber-based optical parametric oscillator having a fiber-based gain medium is provided. The fiber-based gain medium is operable to receive a pump beam of electromagnetic radiation. A first optical device is positioned between a source of the pump beam and the fiber-based gain medium. A second optical device is positioned after the fiber-based gain medium. Each optical device transmits and reflects certain wavelengths. At least a portion of the reflected wavelengths oscillate between the two optical devices. The fiber-based gain medium has a length of 10 cm or less. The fiber-based gain medium is also the entirety of a fiber between the two optical devices.

According to another exemplary embodiment, the fiber-based gain medium is operable to receive a pump beam of electromagnetic radiation. The fiber-based gain medium has a length of 10 cm or less and has a diameter of 3 to 5 microns.

According to another exemplary embodiment, a method of making a fiber-based optical parametric oscillator is provided. The optical parametric oscillator has a desired range for the wavelengths of an output beam. A diameter of a fiber-based gain medium of the optical parametric oscillator is determined. A zero dispersion wavelength of the fiber-based gain medium having the determined diameter is within the desired range. A length of the fiber-based gain medium is determined such that at least two peaks of the output beam span the desired range. The optical parametric oscillator is created using the fiber-based gain medium having the determined diameter and length.

According to another aspect of the present invention, a fiber-based optical parametric oscillator is capable of providing an output pulse energy of at least 102 pJ and providing a bandwidth of at least 102. In one embodiment, a wavelength of an output signal from the oscillator is tunable by a wavelength of the pump pulse.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF EXEMPLARY EMBODIMENTS

Pulsed fiber lasers have advanced in performance rapidly during the past 10 years to the point where micro-joule energy pulses of less than 200 fs are available at wavelengths of 1.04 μm and pico-joule energies are routinely achieved for sub-100 fs pulses at several wavelengths. However, fiber lasers are limited in wavelength tunability and pulse duration flexibility. Embodiments of the present invention use fiber-based optical parametric oscillators (FOPOs), which operate through four-wave mixing (FWM) mediated by the $\chi^{(3)}$ nonlinearity of glass promise to address these shortcomings of fiber lasers.

FOPOs according to embodiments of the present invention are competitive with their $\chi^{(2)}$ counterparts because: the FWM phase-matching bandwidth can be continuous and hundreds of nm wide; signal gain occurs at wavelengths near to, as well as far from, that of the pump; the transverse mode quality of fiber-based oscillators is exceptionally good; and a fiber-based gain medium lends itself to further integration with fiber components. Moreover, the widespread adaptation of ultrafast systems will be greatly facilitated by the development of fiber-integrated synchronous sources.

Current FOPOs remain limited in their power and bandwidth, thus limiting their applicability. The typical fiber lengths are long, e.g. up to 20 m. Such systems utilize the advantage of fiber that attenuation is small, thus allowing a high interaction length over the long fiber length.

In one aspect, embodiments realize a relationship between fiber length and performance, where shorter lengths counter-intuitively provide greater power and width of output bands (termed bandwidth). Thus, embodiments overcome limitations in the standard fiber lasers with regard to the OPOs employed. Fibers of 10 cm or less may be used to obtain superior performance in terms of wavelength tunability (e.g. bandwidth of 200 nm and greater) and output power (e.g. pulse power of 1 nJ).

In another aspect, embodiments realize a relationship between length and the wavelength position of the two output bands from the FOPO. Embodiments use this relationship to select the range of wavelengths that are output from the FOPO. In addition, the diameter of the fiber in the FOPO may be selected to provide a positioning (e.g. a centering) of the range of wavelengths that are output.

I. Fiber-Based Optical Parametric Oscillators

Figure 1:
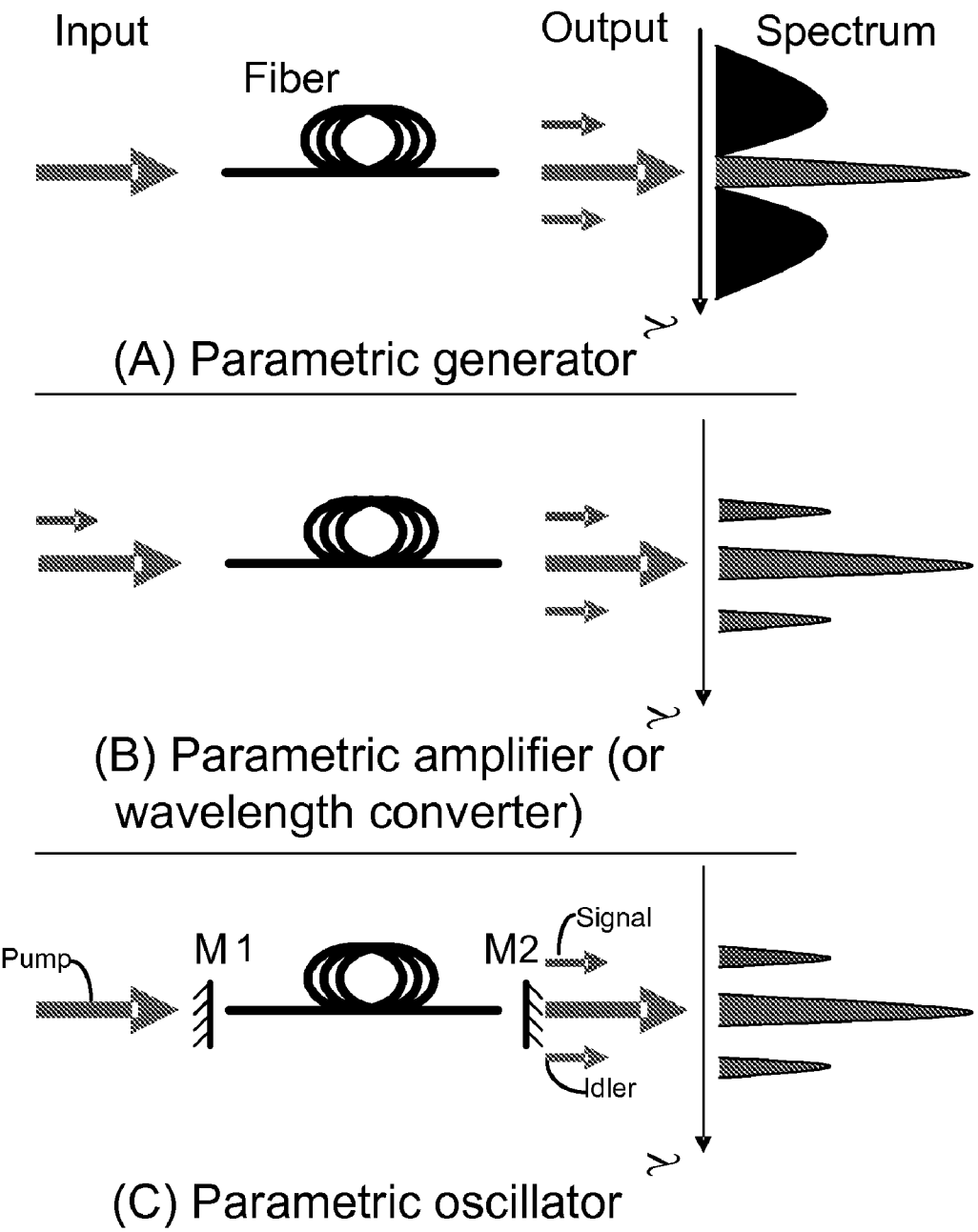
FIGS. 1A-1C shows conceptual representations of (a) a single-pass parametric generator, (b) a single-pass parametric amplifier, and (c) a parametric oscillator.

FIG. 1 shows conceptual representations of (a) a single-pass parametric generator where only a pump is input to the system, (b) a single-pass parametric amplifier where a pump and signal are input to the system, and (c) a parametric oscillator where only a pump is input, but cavity feedback results in coherent buildup of a signal. In (c), there is usually some sort of filter within the cavity that prevents both of the sidebands from oscillating which would result in undesirable phase-sensitive operation.

Three configurations of interest are illustrated schematically in FIG. 1. The parametric generator (FIG. 1A) is a device where a single "pump" field of sufficient power is launched into one end of the Fiber and amplified spontaneous emission (ASE) is observed at the output. The device of FIG. 1A is similar to that used in super continuum generation, which seeks to minimize the spread in a light pulse during a single pass of light.

A parametric amplifier (FIG. 1(b)) includes both "Pump" and "Signal" fields at the input where the system has been designed such that energy is shifted from the strong pump to the weaker signal resulting in amplification of the signal. Energy conservation dictates the generation of a third "conjugate" field whose frequency is such that $2\omega_p = \omega_c + \omega_s$, where $\omega_{p,s,c}$ are the angular frequencies of the pump, signal, and conjugate fields, respectively. The generation of the conjugate field means that the parametric amplifier configuration can also be used for wavelength conversion.

The third configuration (FIG. 1C) is one where there is only a pump input to the system, but the presence of a cavity allows for the coherent buildup of the ASE in a manner similar to laser action. In one embodiment, a first mirror M1 transmits a particular color (wavelength of light) and reflects others. The transmitted pulses or beams of light (electromagnetic radiation) then travel through the Fiber and is reflected at a second mirror M2. The pulses continue to be reflected back and forth until a certain energy threshold is reached. At this point as long as certain factors are present, energy pulses (e.g. Signal, Idler, and Pump) are transmitted though M2. The mirrors could be provided by any suitable material, which includes interfaces between the fiber gain medium and a different segment of fiber. Other embodiments can include additional mirrors or other optical devices.

Figure 2:
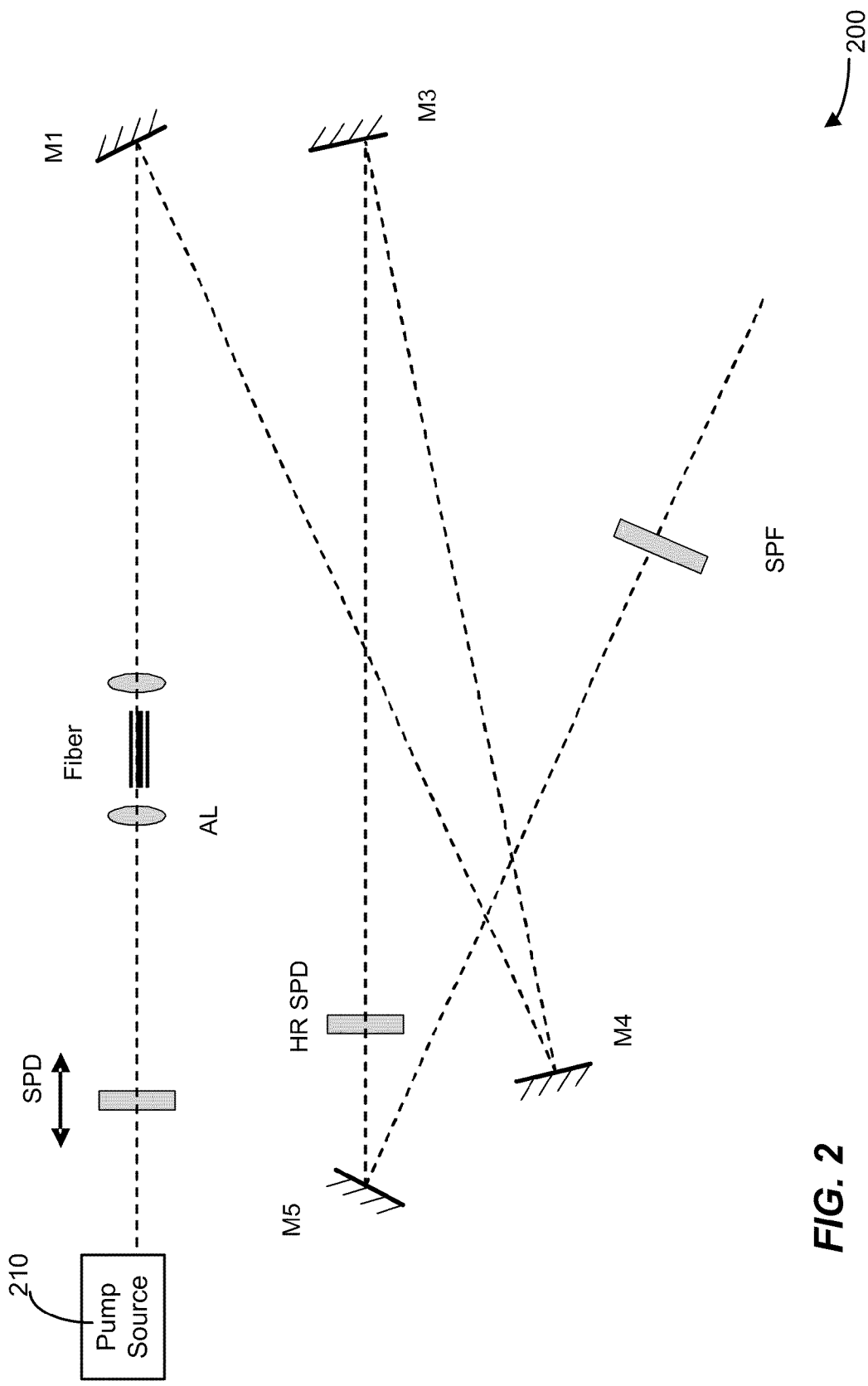
FIG. 2 shows a schematic of a fiber-based optical parametric oscillator (FOPO) according to an embodiment of the present invention.

FIG. 2 shows a fiber-based optical parametric oscillator 200 according to an embodiment of the present invention. M1-M5 are metal mirrors. SPD is a short pass dielectric that transmits certain wavelengths and reflects other wavelengths. The quality of transmission and reflection may differ depending on the direction of the incident (EMR). MF is a microstructure fiber used as the fiber-based gain medium of the FOPO. SPF is a short pass filter. In other embodiments, a ring oscillator may be used or a traveling wave oscillator with feedback may be employed.

The fiber-based OPO 200 utilizes a Fiber within a Fabry-Perot cavity. A pump source 200 provides a pump beam. The pump is coupled into the cavity by using a SPD mirror (one type of optical device). Aspheric lenses (AL) focus the beam into the microstructure fiber MF, and the cavity is folded using broadband metallic mirrors M1-M3. Long wavelengths are reflected by both SPDs and thus oscillate within the cavity, while the conjugate (idler) field at short wavelengths is coupled out through the high reflector (HR) SPD. Prior to detection, the pump is removed using short-pass filters (SPFs). Thus, the conjugate field is provided as an output beam of the FOPO. In another embodiment, the optical devices may reflect the conjugate field and let the signal field pass.

Applications of FOPOs extend beyond their use as sources of light. As a nonlinear optical device, FOPOs can be operated in a bistable mode for data storage applications. That is, a FOPO can be operated in such a way as to maintain a pulse stream injected into it, but it will not self start, hence maintaining zeros or ones in a data stream. The technique has been used to realize erasable and writeable storage buffers for data streams.

Microstructure fibers offer the promise of dramatically extending the wavelengths of operation and efficiency of FOPOs. Differences from standard optical fibers arise from the fact that the refractive index contrast between the core and cladding in MFs is large compared with that in standard optical fibers. This high delta results in additional control in terms of optical field confinement, transverse mode behavior, and waveguide dispersion.

First, confinement of light to the core's small effective area, $A_{eff}$, increases the effective nonlinearity, $\gamma=(n_2\omega)/(cA_{eff})$, where $n_2$ is the nonlinear refractive index, $\omega$ is the angular frequency of the field, and c is the speed of light. Second, these fibers can exhibit single transverse mode propagation over a wide range of wavelengths (400 nm to 2000 nm) which leads to excellent spatial overlap between propagating modes even at widely different wavelengths. Finally, there is a large contribution to the total dispersion arising from the design of the waveguide, which can be used to phase match certain wave-mixing phenomena including FWM.

A desirable feature of OPO 200 is its relatively simple alignment. The cavity length of the oscillator is approximately established by measuring the repetition rate of the pump laser and setting the length of the cavity appropriately. A challenging aspect is coupling the pump light efficiently into the fundamental mode of the MF. Once satisfactory coupling is achieved (~50%), the output from the fiber is collimated towards the output end mirror. An infrared viewer is used to overlap the retro-reflections on both sides of the cavity.

If one has sufficient pump power to obtain about $10\pi$ of nonlinear phase shift, then a visible spot due to supercontinuum generation is observed which aids in alignment and provides more than enough power to observe oscillation. Finally, the cavity length is fine-adjusted by translating the input pump coupler until the system flashes. Once oscillating, the FOPO cavity alignment is optimized by minimizing the pump power threshold of oscillation. A further discussion can be found in Sharping et al. "Generation of sub-100-fs pulses from a microstructure-fiber-based optical parametric oscillator Vol. 16, No. 22/OPTICS EXPRESS 18050 (27 Oct. 2008), which is incorporated by reference.

In one embodiment, the FOPO device uses a 4.2-cm-long MF. Pump light is coupled into the 3-m-long Fabry-Perot cavity through a dichroic mirror and into the MF through an aspheric lens (Thorlabs, C230TM-B) with a maximum total coupling efficiency of ~60%. In a single pass, we observe spectral sidebands due to four-wave mixing. When the FOPO cavity is synchronized with the pump laser cavity, the long wavelengths oscillate while the short wavelengths are coupled out of the cavity via transmission through the high reflector.

II. Phase Matching Conditions

For most applications, the output beam (i.e. the signal or idler) should have sufficient energy in order to be usable. To provide sufficient energy, a sufficient amount of gain should be applied to the signal or idler.

In order to observe efficient gain, phase matching should be achieved, which implies that the propagation constants of the pump, signal, and conjugate fields, including any intensity-dependent phase shifts $\phi_{nl}$, satisfy the relation $\Delta\beta L+\phi_{nl}=0$. The propagation constants for the pump, signal, and conjugate (idler) fields are denoted as $\beta_P$, $\beta_S$, and $\beta_C$, respectively, and $\Delta\beta=\beta_S+\beta_C-2\beta_P$. For the FWM parametric process the energy conservation relation $2\omega_p=\omega_s+\omega_c$ must also hold.

The phase matching condition, $\Delta\beta L+\phi_{nl}=0$, is important because it can be used to determine the wavelengths at which gain is appreciable. The phase matching condition can be exploited to tune the FOPO to have the desired wavelengths receive the appreciable gain.

Figure 3:
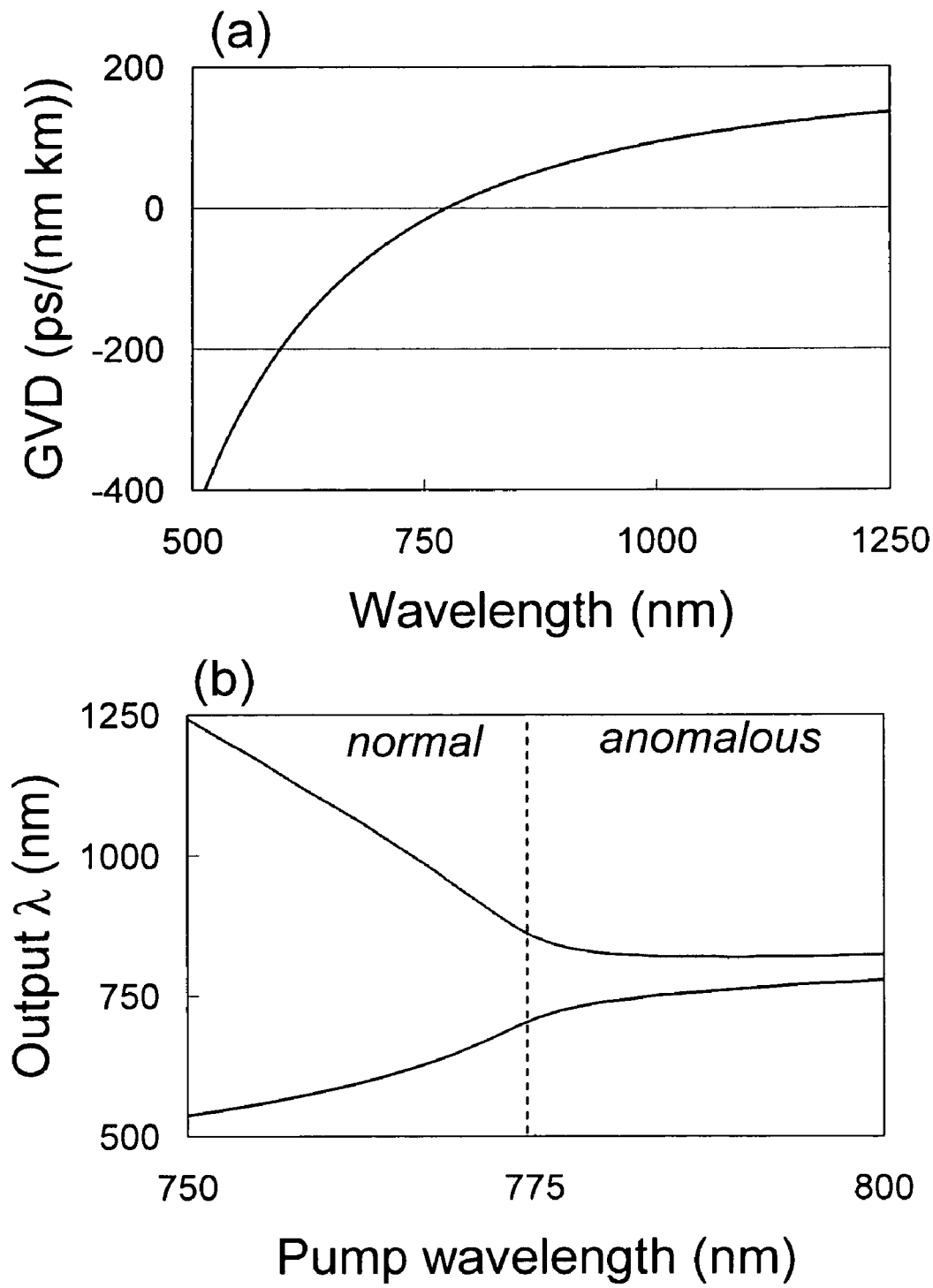
FIG. 3 shows (a) Group-velocity dispersion plotted as a function of wavelength for a glass rod in air with a diameter is 2.3 μm and an effective cladding index of 1.1. (b) the corresponding phase matching locations for different pump wavelengths in the vicinity of the zero-dispersion wavelength according to an embodiment of the present invention.

As an example, let us consider a silica microstructure fiber with a core diameter of 2.3 µm, and an effective cladding refractive index of 1.1. The dispersion properties can be calculated using the model for a glass rod in air, and the group-velocity dispersion (GVD) as a function of wavelength is shown in FIG. 3(a). The GVD changes from normal to anomalous at the zero-dispersion wavelength, which is 774 nm in this case.

The corresponding behavior of the phase matching curves can be seen in FIG. 3(b). One can obtain the perfectly phase matched signal and conjugate wavelengths for a given pump wavelength from this plot. If the pump is located in a region of normal dispersion, the phase matching locations (bands) are relatively far apart. The phase matched wavelengths are closer together when the pump wavelength is tuned into the region of anomalous dispersion. In one aspect, one band corresponds to the signal and the other band to the idler of the FOPO.

Although it is not represented on these plots, the width of the phase matching bands for pumping in the anomalous dispersion are relatively wide. The width of the phase matched bands is narrower in the normal dispersion regime, which corresponds to pump wavelengths shorter than 774 nm in this case. The region when the dispersion transitions from normal to anomalous (zero-dispersion wavelength) provides a combination of broad phase-matched bands and widely spaced phase matching locations.

Accordingly, if the pump is chosen to have a wavelength in the zero-dispersion region (e.g. within 10 or 20 nm of the zero-dispersion wavelength), then potentially the larger range in the positions between the two bands is achieved. Also, the width of each band, also provides a larger range of wavelengths that are attainable in the output beam through appreciable gain.

III. Wavelength Tuning—Selection of Diameter of Fiber

Figure 4:
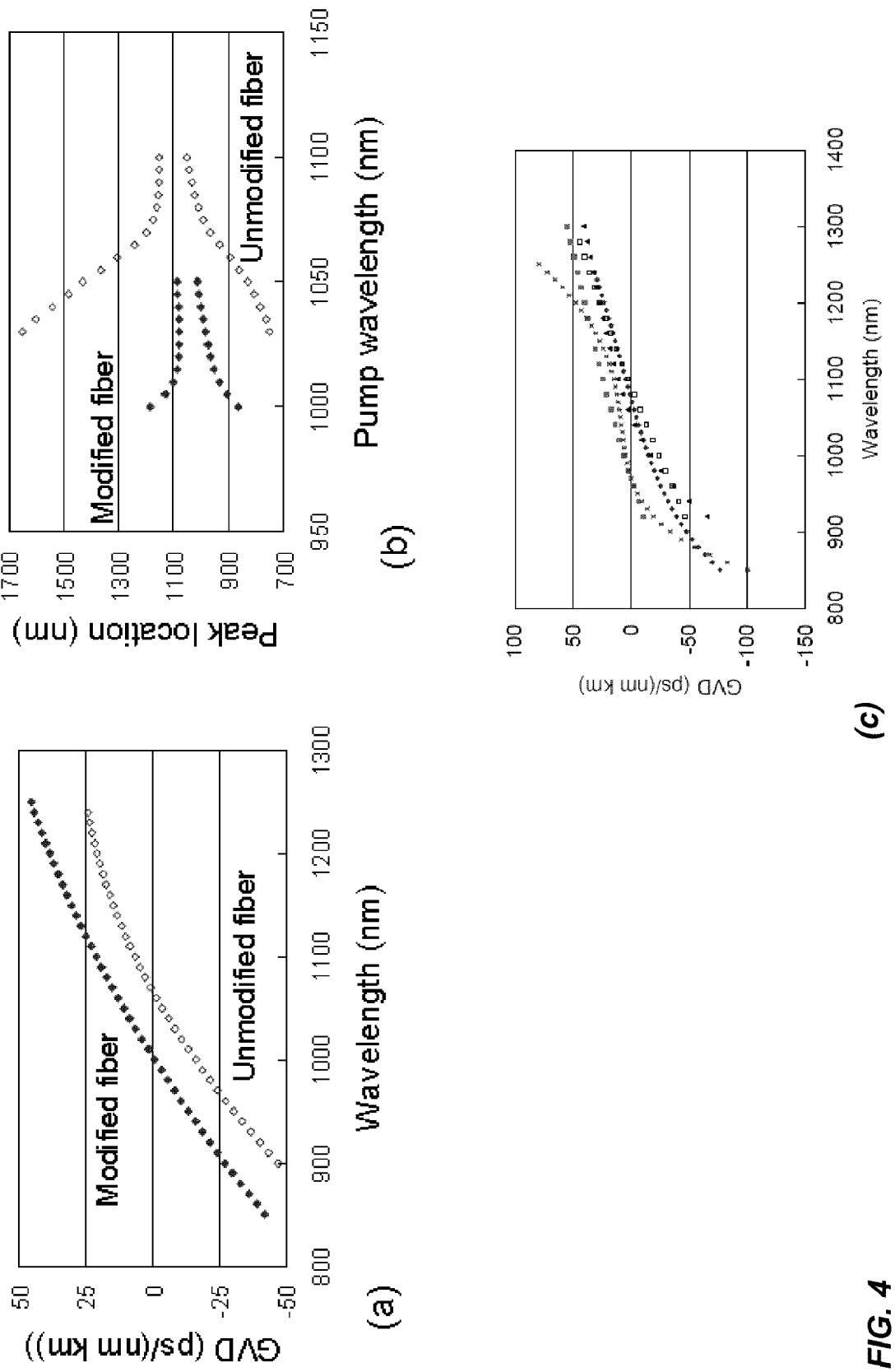
FIG. 4 shows (a) Before- and after-modification plots of measured GVD vs. wavelength for the SC-5.0-1040 MF used to provide parametric gain for the FOPO; (b) calculated phase matched peak locations according to the measured GVD profile for the same two fibers; and (c) GVD as a function of wavelength for several fibers used in this study according to embodiments of the present invention.

Additionally, the position of the bands may be moved in order to achieve a selection of a desired range of output wavelengths. The diameter may be used to shift the positions of the bands to higher or lower wavelengths. This effect is shown in FIG. 4 (a)-(b).

The MF used here is a commercially available MF (Crystal Fibre-SC-5.0-1040) that has been drawn down to a reduced core size in order to modify the fiber's dispersion profile. A filament-heated tapering setup is used to modify the fiber and remove the transition regions which leaves just the narrowed waist region. The tapering setup can produce drawn-down fibers in excess of 10 cm in length. The dispersion-zero of the fiber is measured using spectral interferometry in which the short MF under test is placed in one arm of a Michelson interferometer. The wavelength dependence of the pulse delay can be obtained by comparing the delay measured from the front fiber facet reflection and the output fiber facet reflection.

The group-velocity dispersion (GVD) as a function of wavelength is shown in FIG. 4(a) for both the modified fiber and the unmodified (as purchased) fiber. The dispersion zero is 1010 nm for the modified fiber (core diameter of 4 μm, nonlinear coefficient γ~12 (W km)−1) and 1060 nm for the unmodified fiber (core diameter of 5 μm, γ~10 (W km)−1). The nonlinear coefficients for the resulting dispersion profile for the modified fiber is nearly ideal for use in a FOPO which is pumped by a 1032 nm Ytterbium-doped fiber laser.

Based on this ability to shift the range of the output wavelengths to higher or smaller wavelengths, embodiments have fine tuned the spectral range to be in the range of about 900 to 1200 nm, and even a larger range of 700 to 1400 nm, which are of particular interest for use with biological systems. The diameters for obtaining such ranges are in the range of 3 to 5 microns. The fiber could also be tailored for a particular pump laser in this manner.

This can be seen in FIG. 4(b) where the phase matched "peak" location is plotted as a function of pump laser wavelength for both the modified and unmodified fibers. Note that the resulting fiber also has a relatively large glass-to-air fraction in the cladding of the MF. Our experiments suggest that fibers with large glass-to-air filling ratios are less susceptible to damage, presumably because coupling of the intense pump light into the interstitial strands of glass is less likely.

The pump laser source is a 370-fs, 50-MHz mode-locked Ytterbium-doped fiber laser (PolarOnyx-Uranus) with a polarized output. The laser consists of a seed oscillator followed by an amplifier, and we measured the repetition rate stability to be +/−20 Hz/hour, corresponding to a length fluctuation of about 4.8 μm/hour. This level of stability is important since the FOPO cavity must remain synchronous with that of the pump laser. Inclusion of all losses due to isolating the pump source, delivering the pump light into the system, and coupling into the fiber are included, results in a maximum of about 1.2 W of average power delivered through the fiber.

FIG. 4(c) plots of different GVD vs. wavelength for fibers of different diameter. The method of creating such diameters and results are further described in a systematic study of MFs whose microstructures have been drawn down in size in order to adjust the fibers' group-velocity dispersion (GVD) profiles. The diameters of FIG. 4(c) are primarily concerned with fibers designed to be pumped by Yb-fiber lasers operating at 1032 nm, but the techniques employed here can be used to prepare MFs for systems operating at other wavelengths as well. For each tapering recipe our characterization includes an interferometric measurement of the resulting fiber's GVD profile, scanning electron microscope (SEM) images of the fiber's cross-section, and a validation of performance within a FOPO.

Regarding the tapering process, one can begin with a few centimeters of SC-5.0-1040 microstructure fiber (available from ThorLabs). Prior to tapering, the fiber ends are sealed and spliced to standard optical fiber. Attaching standard optical fiber also allows us to monitor the optical transmission as the fiber is drawn down. When successful, the drawing process introduces less than 1 dB of loss. Tapering an optical fiber involves heating the desired taper region and applying tension away from both ends at the same time. If the necessary temperature and pulling speeds are met, then the fiber will "draw down", or reduce, thereby preserving its original form. When the heat source is too hot for the fiber, then the microstructure will collapse. In one embodiment, we taper the MF using a flame and extract the uniform-sized waist region. Using this technique we can obtain uniformly reduced MFs a few cm in length having cross-sectional area reduction ratios in the range of 0-50%.

The dispersion curve of each sample is measured using spectral interferometry in a Michelson configuration. Broadband light is launched into the interferometer and the relative delay between the two arms produces a sinusoidal pattern in the output optical spectrum. Two sets of measurements are made for each fiber, one aligned to observe the reflection from the front cleave of the MF and the second aligned to observe the reflection from the back cleave of the MF. These two sets of measurements are fitted to a Sellmeier curve and compared with one another to obtain the dispersive group velocity response of the MF. We can perform a preliminary visual inspection of each tapered fiber using an optical microscope to verify that the microstructure is still intact. More quantitative information is gathered from SEM images allowing us to fully characterize the effect of the tapering process on feature size and air-fill fraction. Finally we evaluate the performance of the modified MF within a FOPO cavity.

Table I below provides tapering parameters and fiber properties for some fibers tapered in the manner provided.

| Fiber | Tapering parameters | Fiber properties |
|---|---|---|
| SC-5.0-1040 | Not applicable | Dispersion zero (meas) - 1070 nm |
| P1 | Speed pulled - 0.3 mm/s<br>Speed of brushing stage - 10 mm/s<br>Length of $H_2$ flame - 3 mm<br>Length of tapering region - 16 mm<br>Total distance pulled - 20 mm | Dispersion zero (meas) - 970 nm |
| P2 | Speed pulled - 0.35 mm/s<br>Speed of brushing stage - 10 mm/s<br>Length of $H_2$ flame - 3 mm<br>Length of tapering region - 29 mm<br>Total distance pulled - 20 mm | Dispersion zero (meas) - 1050 nm |

IV. Increasing Power and Bandwidth—Selection of Length

The length of the fiber may be chosen to provide a desired power and width of output and oscillating bands. In one aspect, the power and bandwidth are governed by the gain provided to a band.

An equation governing gain is provided in equation (1). One begins with a set of coupled-amplitude equations for electric fields with a slowly-varying envelope propagating through a nonlinear medium of length L in the z-direction.

For an undepleted pump wave, the small-signal gain of the signal field can be expressed as, $$G_s = \frac{P_S(L)}{P_S(0)} = 1 + \left[\frac{\gamma P_P}{g}\sinh(gL)\right]^2, \quad (1)$$

where $P_S$ is the signal power, $P_P$ is the pump power, and the parametric gain coefficient is $g=[-\Delta\beta(\Delta\beta/4+\gamma P_P)]^{1/2}$. The propagation constants for the pump, signal, and conjugate (idler) fields are denoted as $\beta_P$, $\beta_S$, and $\beta_C$, respectively, and $\Delta\beta=\beta_S+\beta_C-2\beta_P$. Equation 1 is strictly valid for continuous wave (CW) fields. Nevertheless, it turns out to provide enormous insight for pulsed systems.

The basic requirement for increasing the output power of pulsed FOPOs is counterintuitive at first. When working with optical fibers one generally uses the longest optical fiber available in order to maximize the nonlinear interaction length. However, the conversion of pump power into the signal and conjugate fields generally saturates at about 10-20%. The nonlinearity, $\gamma$, pump power, and fiber length, L, should be chosen so that the system operates slightly below the saturation power. We have found experimentally that a good operating point for pulsed FOPOs is where there is a moderate amount of self-phase modulation of the pump ($\gamma P_p L \sim \pi$), which implies that reducing the length of the fiber permits an increase in the pump power for a given amount of self-phase modulation.

A second strategy for extracting more power from the system is to couple out the conjugate field rather than the oscillating signal field. One can output couple 100 percent of the optical power in the conjugate field without changing the threshold of oscillation, which is determined by the gain and loss in the signal field. Fibers with zero-GVD wavelengths of 774 nm will typically have $\gamma=75$ (W km)$^{-1}$. A commercial Ti:Sapphire oscillator can deliver about 2.5 kW of pump peak power into the fiber (i.e., 500 mW, at a repetition rate of 75 MHz, for 2.7 ps pump pulses). For $\gamma P_p L = \pi$ the optimal fiber length is about 2 cm, and under these conditions one can expect on the order of 10 to 20 percent of the pump energy to be converted to either signal or conjugate output energy. With the above assumptions, FIG. 5B shows the expected output energy as a function of fiber length.

Decreasing the length of the fiber also has the effect of increasing the phase-matching bandwidth, by keeping $\Delta\beta L$ close to zero. According to Eq. (1), FIG. 5B shows a comparison of the single-pass, small-signal gain as a function of wavelength for different lengths of fiber where $\gamma P_p L = \pi$. The plots reveal the dramatic increase in the expected bandwidth of operation as the fiber length is decreased. The negative-exponential relationship between the gain bandwidth and fiber length is plotted on the right axis of FIG. 5B.

Another consequence of the phase matching conditions $\Delta\beta L + \phi_{nl} = 0$ is that the length of the fiber can affect the positions of the bands. For example, a shorter wavelength will squeeze together the bands so that there is a smaller range between the bands.

Figure 5:
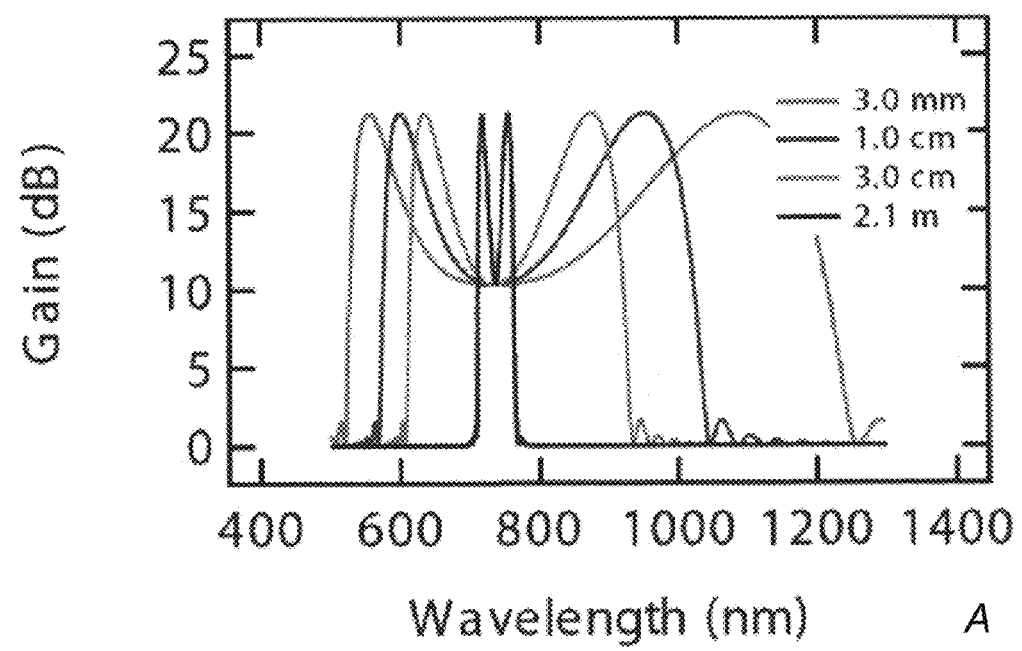
FIG. 5 showing the improvement in device performance as the fiber length is reduced. (a) depicts the small-signal single pass gain as a function of wavelength for fiber lengths ranging from 3 mm to 2.1 m. (b) shows the expected output pulse energy (left axis) and gain bandwidth (right axis) as a function of fiber length.
Figure 5:
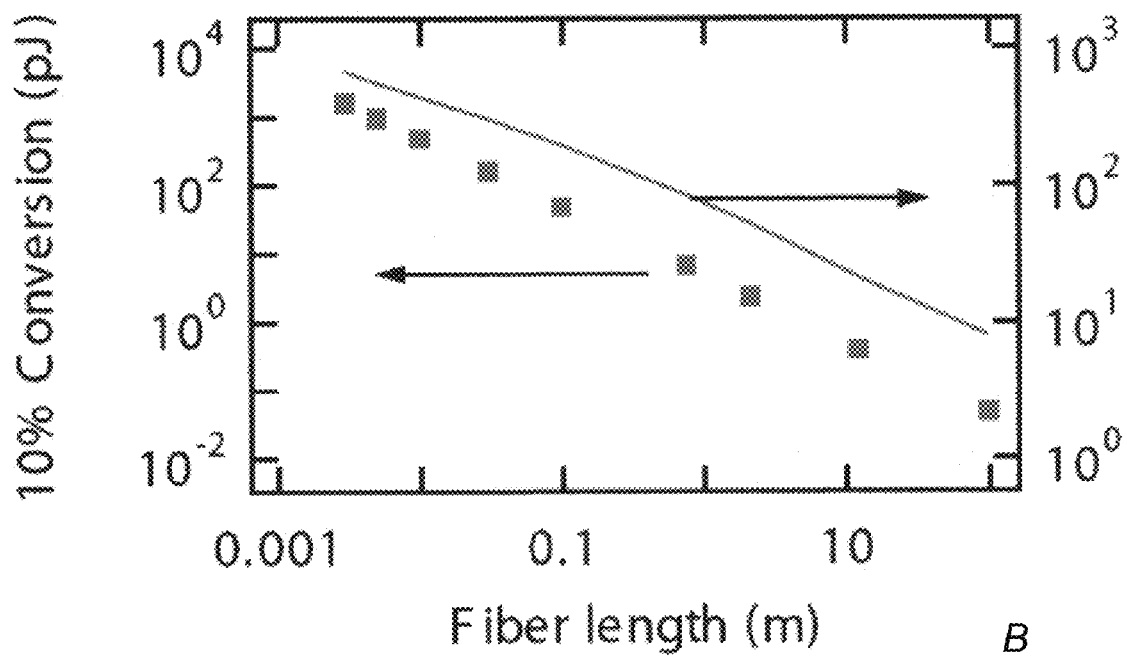

This effect can be seen in FIG. 5A. If one looks at the top of the two peaks for each of the plots for the different length fibers. For the 2.1 m fiber, the two peaks are very close to each other. As the length is decreased to 3 cm, 1.0 cm, and 3 mm, the distance between the two peaks increases. Accordingly, the range of attainable wavelengths increases.

Additionally, as described above, the width of each band also increases. As one can see from FIG. 5A, the width of each of these bands is larger.

Within a parametric oscillator, pump depletion also comes into play. This can be included by following a slightly more complex analysis which is described in G. Cappellini and S. Trillo, J. Opt. Soc. Amer. B, vol. 8, no. 4, pp. 824-838, 1991 and C. J. McKinstrie, et al., J. Opt. Soc. Amer. B, vol. 10, no. 10, pp. 1856-1869, 1993. The solutions describe the energy exchange among the various fields and they take the form of elliptic functions.

Any useful FOPO will be operating in a regime of strong-interaction between the pump, signal and conjugate fields, where pump depletion is present. Under these conditions the output efficiency and phase matching behavior changes from that described above. In particular, we will expect that optimum power conversion will happen at a detuning that is about half that predicted by (1).

Pulsed operation leads to time-dependent pump depletion, nonlinear phase shift, and gain within the FOPO. In principle, CW OPOs can operate at 50% conversion efficiency into each sideband which corresponds to 100% pump depletion. For the pulsed case, optimum conversion efficiency can only be achieved at a particular instant in time, therefore the overall conversion efficiency will be somewhat less than 50%. When adjusted optimally there will be a larger gain near the peak of a pulse than at the rising or falling edges of it. It is critical to adjust the pump power for optimum conversion near the center of the pulse because pumping with too much power will result in a complicated temporal profile such as multiple closely spaced pulses at the output.

V. Results

In one embodiment, a system oscillates at 1250 nm with the conjugate field at 880 nm coupled out of the cavity, using a 4.2 cm MF. Typical measurements of the optical spectrum and pulse autocorrelation imply a Gaussian pulse width of 70 fs. The system has a threshold peak pump power of 19 kW. Adjusted for a minimum pulse duration the FOPO produces 0.4 nJ pulses with an output peak power of 5.0 kW for a pump peak power of 22 kW. This represents greater than 20% peak power conversion into useful output. The system can be adjusted to produce pulses with energies as large as 1.2 nJ.

In one aspect, a system can be constructed with a minimum of filtering and dispersion in hopes of generating pulses with a broad spectral content. The center wavelength can, however, be tuned slightly (+/−5 nm) by translating the aspheric fiber coupling lenses. In one aspect, the actual wavelength of operation differs from the predicted peak location, potentially due to the nonlinear phase shift introduced by the high power pump pulses.

The resulting output pulse duration is dependent on a combination of several factors: the achievable parametric gain bandwidth, the chirp of the input pulses, saturation of the gain above a certain peak pump power, and the amount of dispersion in the cavity. Firstly, we expect a lower limit to pulse duration that is given by the parametric gain bandwidth. Secondly, once pulses are generated, they accumulate a spectral phase contribution from GVD that is present in the cavity. The third factor comes from the fact that the oscillating signal and the output conjugate field are phase-conjugates of each other. This means that the output is created within the MF having the same magnitude but opposite sign chirp as the oscillating signal. The interplay of these pulse evolution factors is the subject of ongoing investigation. The data shows that the shortest pulses are nearly transform limited with a time-bandwidth product of 0.67 for a Gaussian pulse shape (the transform limited pulse duration is 50 fs).

In one embodiment, there is a dependence of the output on pump power. The spectral width increases with power and develops additional structure. Eventually, a dip forms in the center of the spectrum giving clear evidence of the onset of gain saturation. The autocorrelations are consistent with the spectral data in which sidebands form on the traces which suggest the presence of saturation near the peak of the pulse. Although oscillation can occur for an extremely wide range of pump powers, these data reveal that the shortest pulse durations are achieved for a fairly narrow range of pump powers.

Figure 6A:
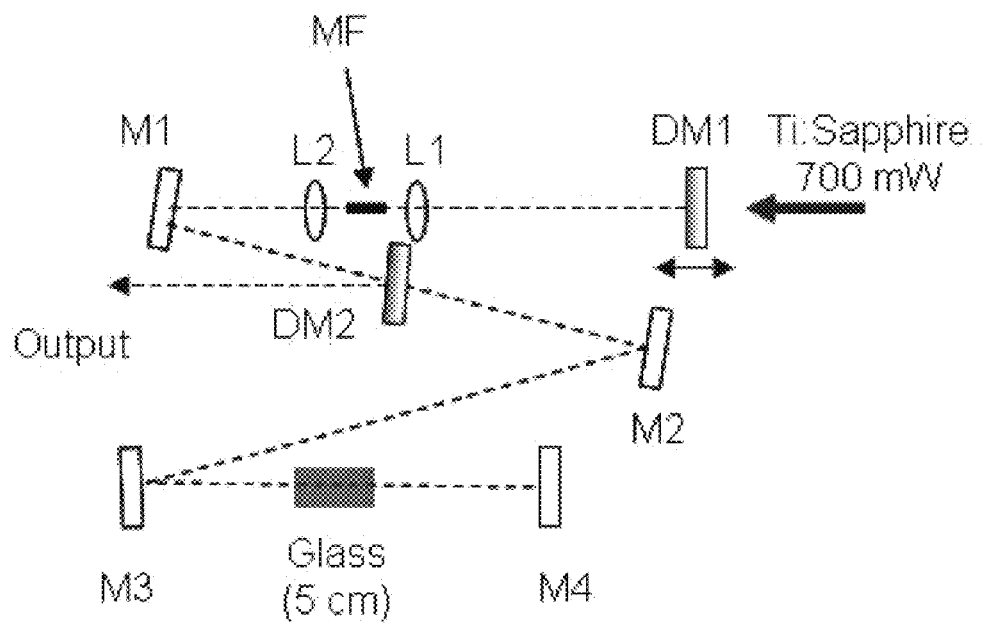
FIG. 6A shows a schematic of a FOPO according to an embodiment of the present invention.

FIG. 6A shows a FOPPO according to an embodiment of the present invention. Pulses from a Ti:Sapphire laser (740 nm-820 nm in wavelength, 200 fs or 1.6 ps in pulse duration, 76-MHz repetition rate, and 700-mW average power) are coupled into the MF via a dichroic mirror (DM1) and a short focal-length aspheric lens or microscope objective (L1). A second lens (L2) is placed at the output of the MF such that the pump light is nearly collimated. The oscillator is a Fabry-Perot cavity formed between a broadband high reflector (M4) and DM1. The output is captured using a second dichroic mirror (DM2). The dichroic mirrors DM1 and DM2 are both coated such that they pass the pump wavelength, but DM1 reflects wavelengths longer than the pump (i.e., it is a short-pass dichroic), while DM2 reflects wavelengths shorter than the pump (i.e., it is a long-pass dichroic). Inclusion of the 5-cm piece of glass allows the wavelength of operation to be dispersion-tuned by translating DM1. Cavity folding mirrors M1-M3 allow the system to fit conveniently onto an 18-by-24-inch breadboard.

Figure 6B:
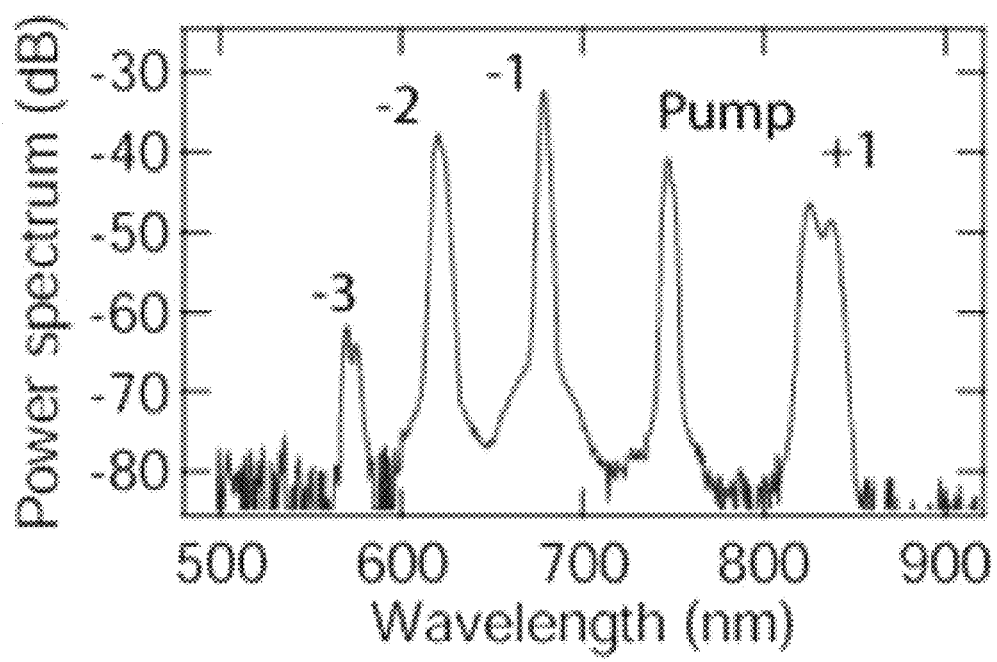
FIG. 6B shows a typical output spectrum where the FWM orders are labeled, and the system is configured to oscillate in the +1 order according to an embodiment of the present invention.

FIG. 6B illustrates a typical output spectrum where the FWM orders are labeled, and the system is configured to oscillate in the +1 order according to an embodiment of the present invention. With the cavity length adjusted for synchronous operation, the system as described above oscillates at wavelengths longer than the pump wavelength and which fall within the gain bandwidth of the FWM process. The conjugate field, which corresponds to shorter wavelengths than that of the pump, is coupled out. A 1.8-μm-core MF system is shown in FIG. 6. These FOPO results are for a pump at a fixed wavelength of 740 nm. It can be reconfigured to oscillate at wavelengths shorter than the pump by swapping DM1 and DM2.

FIG. 6B also shows that the output energy is divided between three modes (labeled −1, −2, and −3). The additional two modes −2 and −3 result from an increase in the pump power, relative to the peaks shown, e.g., in FIG. 5A. Different amounts of peaks may thus be obtained. These peaks may be at lower (or higher as the case may be) wavelengths than the peaks at lower pump energies. Thus, using the pump power is another parameter that may be varied to obtain the desired wavelength range for the output beam. For example, the positions of the two outer peaks the −3 and the +1 may be tuned with the pump power, as well as the fiber length and fiber core diameter. The output wavelength may also be tuned by translating DM1. A further discussion can be found in Sharping et al., "Octave-spanning, high-power microstructure fiber-based optical parametric oscillators" Vol. 15, No. 4/OPTICS EXPRESS 1474 (19 Feb. 2007), which is herein incorporated by reference.

Referring back to FIG. 2, where the MF has been placed within a Fabry-Perot cavity, the following discusses some of the practical aspects of obtaining a working system. By obtaining good cleaved ends of the MF, using a properly chosen aspheric lens in front of the MF, and choosing appropriate pump mode-matching lenses outside of the cavity, one can obtain low loss coupling through the short MF. In practice, the value that one can obtain depends on the core size of the MF that is being used, but 40% to 50% is typical for small core fibers (less than 2 μm core diameter) and greater than 60% is typical for larger core fibers (greater than 4 μm core diameter). Using achromatic objectives may result in better system performance, although this has not been carefully studied. The pump beam waist should be located near the input short-pass dielectric mirror (SPD) because that is also a location of the waist of the oscillating mode. Most MFs exhibit some amount of birefringence. The pump polarization should be aligned with the polarization modes of the fiber.

An interesting feature of the fiber parametric amplifier is that it can exhibit phase-sensitive gain. Phase sensitive operation within the FOPO cavity should be avoided because it will result in unstable output. Phase sensitive parametric gain occurs when all three fields (signal, conjugate, and pump) are coupled into the fiber. As a result it is important to couple out, or filter away, one of the sidebands. The filtering is accomplished in the implementation in FIG. 2 by the combined effects of the two SPDs.

Parametric amplification is an ultrafast process mediated by the electronic susceptibility of the material. There is no long-lived excited state, so the FOPO cavity must be aligned so that it is synchronous with that of the pump laser cavity. The goal is to amplify the parametric scattering after each round trip through the system, and so a new pump pulse must be passing through the MF when the photons generated by the previous pulse are passing through. Additionally, the ultrafast pump pulses can experience distortion upon propagation through the MF. When the cavity is perfectly aligned then the system produces a stable pulse train with a minimum of amplitude fluctuations. Unstable amplitude fluctuations are present if the cavity is not perfectly synchronous.

It is important to note that the nonlinear phase shift, and therefore the gain, in the FOPO are temporally dependent. There is a larger gain near the peak of a pulse than at the rising or falling edges of it. It is critical to adjust the pump power for optimum conversion near the center of the pulse. Pumping with too much power will result in a complicated temporal profile such as multiple closely spaced pulses at the output.

As described above, a fiber with the correct GVD behavior can obtain wide band parametric amplification. Referring to FIG. 3(b), one wants to choose a fiber and pump wavelength so that the system operates in the transition region between anomalous and normal GVD. The system will still operate over a fairly wide bandwidth when the pump laser is tuned slightly into the anomalous GVD, and in practice the system is much easier to align under these conditions. Oscillation is considerably more challenging to obtain for operation even slightly into the region of normal GVD.

The cavity lifetime is also an interesting consideration. The systems described previously have relatively lossless cavity mirrors at the oscillating wavelength, but suffer significant loss due to fiber input coupling. It is reasonable to estimate that the round-trip loss exceeds 70%. In order to identify the optimum oscillating signal feedback condition we must consider the goal of shifting as much energy as possible from the pump into the output conjugate field. Using this system we can independently adjust the feedback of the oscillating signal to obtain the optimum pump depletion. In some embodiments, the entire pump can be depleted for reasonable system choices even if only 0.1% of the signal is fed back in each pass.

In one embodiment, the system depicted in FIG. 2 will operate at a fixed center wavelength corresponding to the peak of the parametric gain. Wavelength tunability can be introduced by including a dispersive element within the cavity. If sufficient dispersion is added then the optical path length depends on wavelength. As such, the wavelength at which synchronous operation is achieved depends on the position of one of the end mirrors within the cavity. A system tuned in this manner is described in Ref. [J. E. Sharping et al., *Opt. Express,* 15(4):1474-1479 (2007)].

As described herein, different wavelengths can be chosen, for example, the wavelengths having peaks. This increased number of wavelengths provides greater tunability, which may be important for stimulating certain objects that are sensitive to the exact value of the wavelength. In one aspect, phase matching, where the energy pulses match in phase with the induced interaction of the optical fiber, provides an increase in a number of usable wavelengths. Energy from the pump can then be induced into the side bands, as shown.

Given the growing suite of specialty fibers that are commercially available, FOPOs show much promise as a laboratory and commercial tool. The scheme can be implemented throughout the transparency range of optical fibers assuming the required short pulsed pump laser is available. This approach is particularly interesting for introducing broad tunability to mode-locked ytterbium and erbium fiber lasers. A second area of promise is for generation of few-cycle pulses.

These recent results represent three critical achievements: (i) the demonstration of a tunable bandwidth that potentially extends from 600 nm up to 1400 nm; (ii) a tunable FOPO that produces sufficient output peak power to serve as a source for nonlinear optical studies such as multi-photon microscopy; and (iii) the production of ultrashort pulses in a fiber-parametric device with durations of tens of femtoseconds. This approach is particularly interesting for introducing broad tunability to mode-locked ytterbium and erbium fiber lasers.

In one embodiment, the pump source (e.g. a bulk device) incorporates an optical fiber as the gain medium, and illustrates numerous desirable features. Since all the fields are collinear, the system is extremely robust and easy to align, as compared to most $\chi^{(2)}$-based OPOs. Furthermore, the fiber fixes the spatial mode of the cavity so that each half of the cavity can be aligned independently. Additionally, the parametric amplification process results in very high gain so that a large percentage of output coupling and other cavity losses can be tolerated. Wavelength tunability is achieved by translating a single stage. A further discussion of FOPOS can be found in Sharping et al., "Microstructure Fiber Based Optical Parametric Oscillators," Journal Of Lightwave Technology, Vol. 26, No. 14, Jul. 15, 2008), which is herein incorporated by reference.

VI. Method of Tuning

Figure 7:
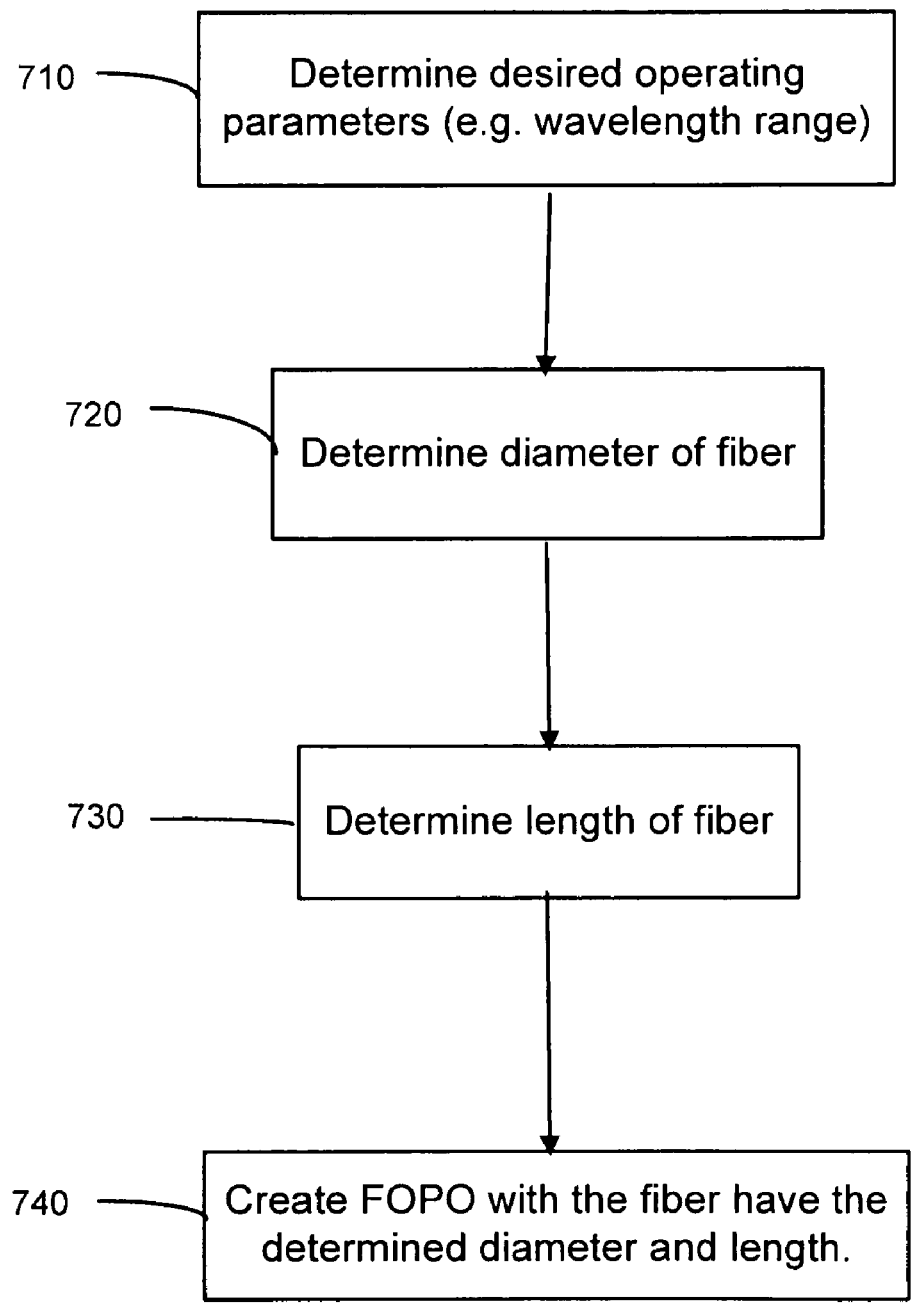
FIG. 7 is a flowchart of a method 700 of designing and/or manufacturing a fiber-based optical parametric oscillator according to an embodiment of the present invention.

FIG. 7 is a flowchart of a method 700 of designing and/or manufacturing a fiber-based optical parametric oscillator according to an embodiment of the present invention.

In step 710, one or more desired operating parameters (e.g. wavelength range) are determined. The determination may be based on a particular application. For example, if the application is for biological systems, then the tunable wavelength range may be determined to be between 700 nm and 1400 nm.

In step 720, a diameter of a fiber-based gain medium of the optical parametric oscillator is determined. In one aspect, the diameter is determined so that the fiber-based gain medium with the determined diameter has a zero dispersion wavelength that is within desired range. Plots such as that of FIG. 3(a) may be used in such a determination. In one aspect, the diameter may be varied to shift the positions of the different bands (idler and signal) to lower or higher wavelengths.

In step 730, a length of the fiber-based gain medium is determined. In one aspect, the length is chosen such that two peaks of the output beam span the desired range. For example, the position of the peaks of the idler and signal may be selected to be at the upper end and the lower end of the desired range. The widths of these peaks may also be chosen to provide the desired bandwidth and range of the wavelengths for the output beam.

In step 740, an optical parametric oscillator using a fiber-based gain medium having the determined diameter and length is created. In one aspect, by choosing a fiber of optimized length and core diameter one can combine spectral broadening from the enhanced effective nonlinearity with higher-order soliton compression.

Figure 8:
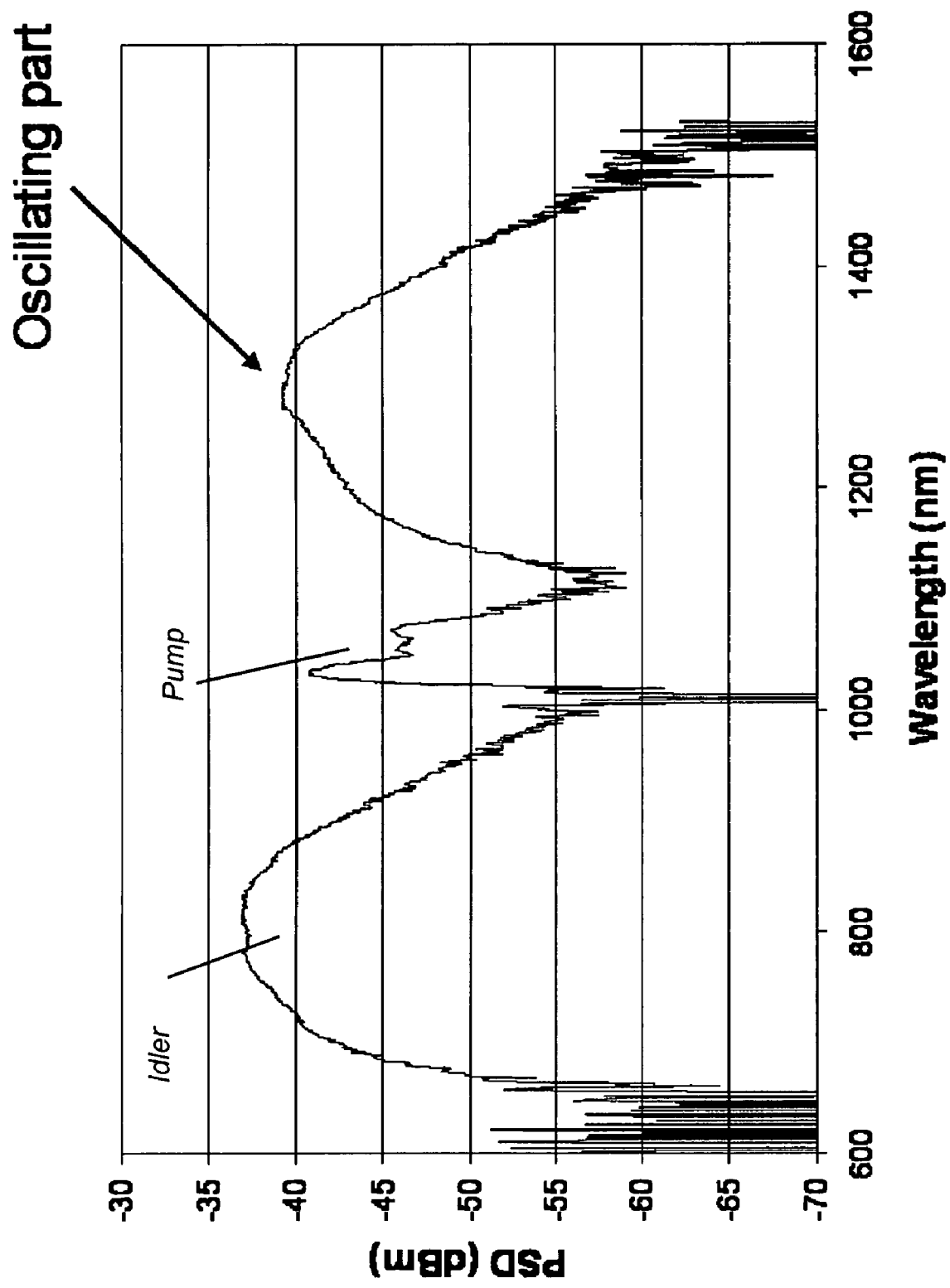
FIG. 8. shows a spectral output of one embodiment of the FOPO showing broad potential tunable bandwidth according to an embodiment of the present invention.

FIG. 8. shows a spectral output of one embodiment of an FOPO showing broad potential tunable bandwidth manufactured according to an embodiment of the present invention.

The plot shows the range of wavelengths along the x axis. The left peak corresponds to the idler, which may be used as the output beam, as described herein. This peak may be shifted to the left by choosing a smaller core diameter or by choosing a smaller length of fiber. The width of this peak may also be increased by choosing a smaller length of fiber. When the idler is the output, the oscillating part is the signal. In another embodiment, the signal may be used as the output, and thus the idler would be used as the oscillating band.

Figure 9:
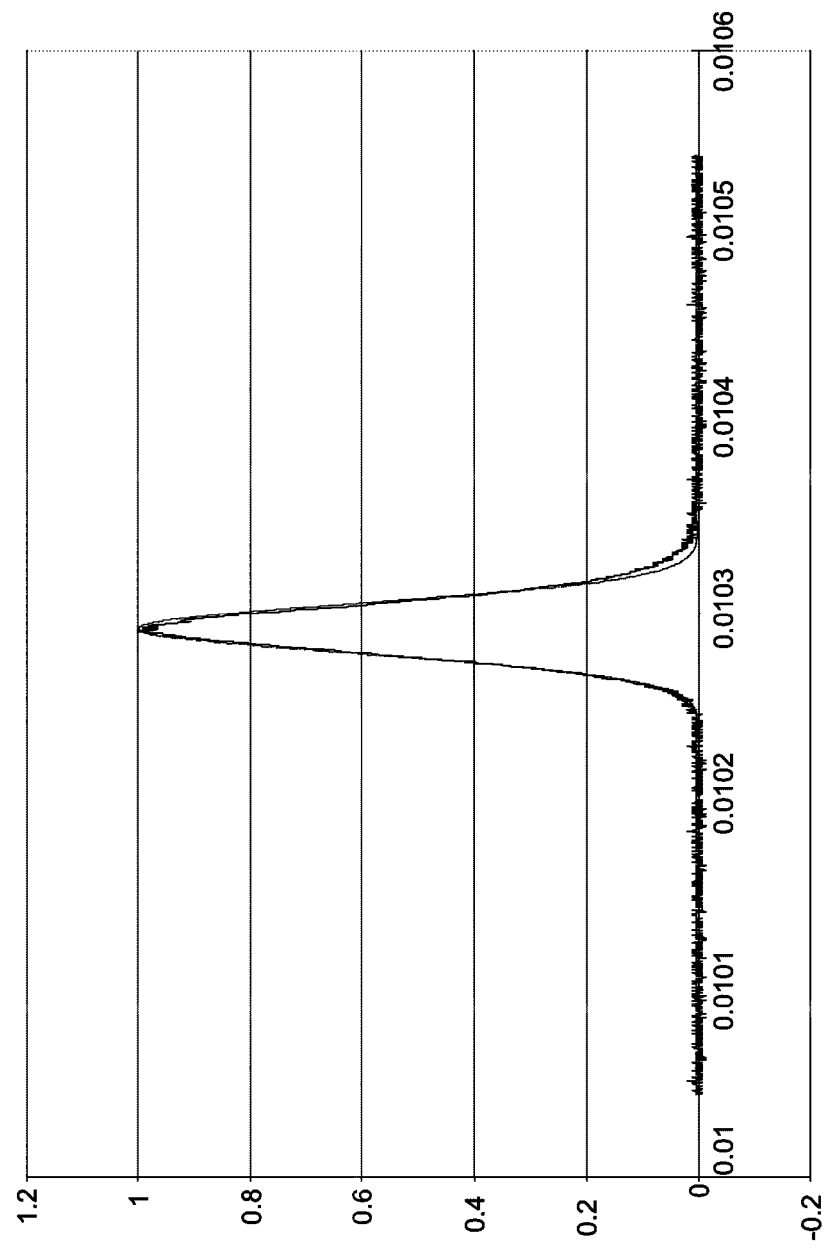
FIG. 9 shows autocorrelation of the output of the FOPO showing the short 32 fs pulse width according to an embodiment of the present invention.

FIG. 9 shows autocorrelation of the output of the FOPO showing a short 32 fs pulse width (at half maximum) according to an embodiment of the present invention. The pulse width of the FOPO may also be tuned using the method 700. If a manufacturer/designer uses a larger available range of wavelength, then a small pulse width may be achieved.

VII. Additional Applications

Figure 10:
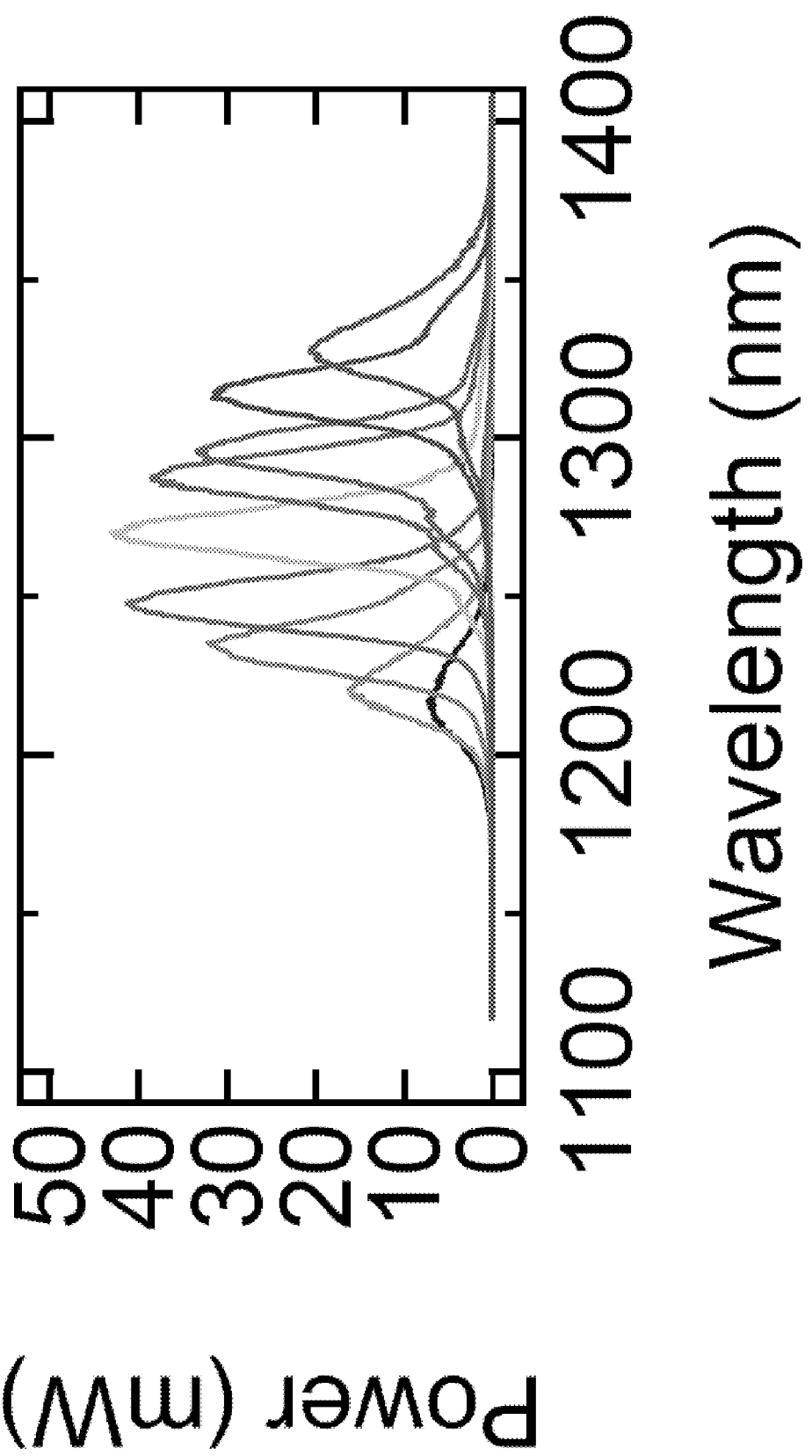
FIG. 10 shows a composite optical spectrum for several different tuning settings of a FOPO operating in the IR wavelength range according to an embodiment of the present invention.

Another promising variation on this system is currently under investigation. It delivers output wavelengths in the 1300 nm wavelength range (tunable over about 130 nm) with average powers as high as 50 mW, pulse energies ~1 nJ, and pulse durations ~100 fs. Experimentally measured optical spectra are shown in FIG. 10. FIG. 10 shows a composite optical spectrum for several different tuning settings of a FOPO operating in the IR wavelength range according to an embodiment of the present invention.

Figure 11:
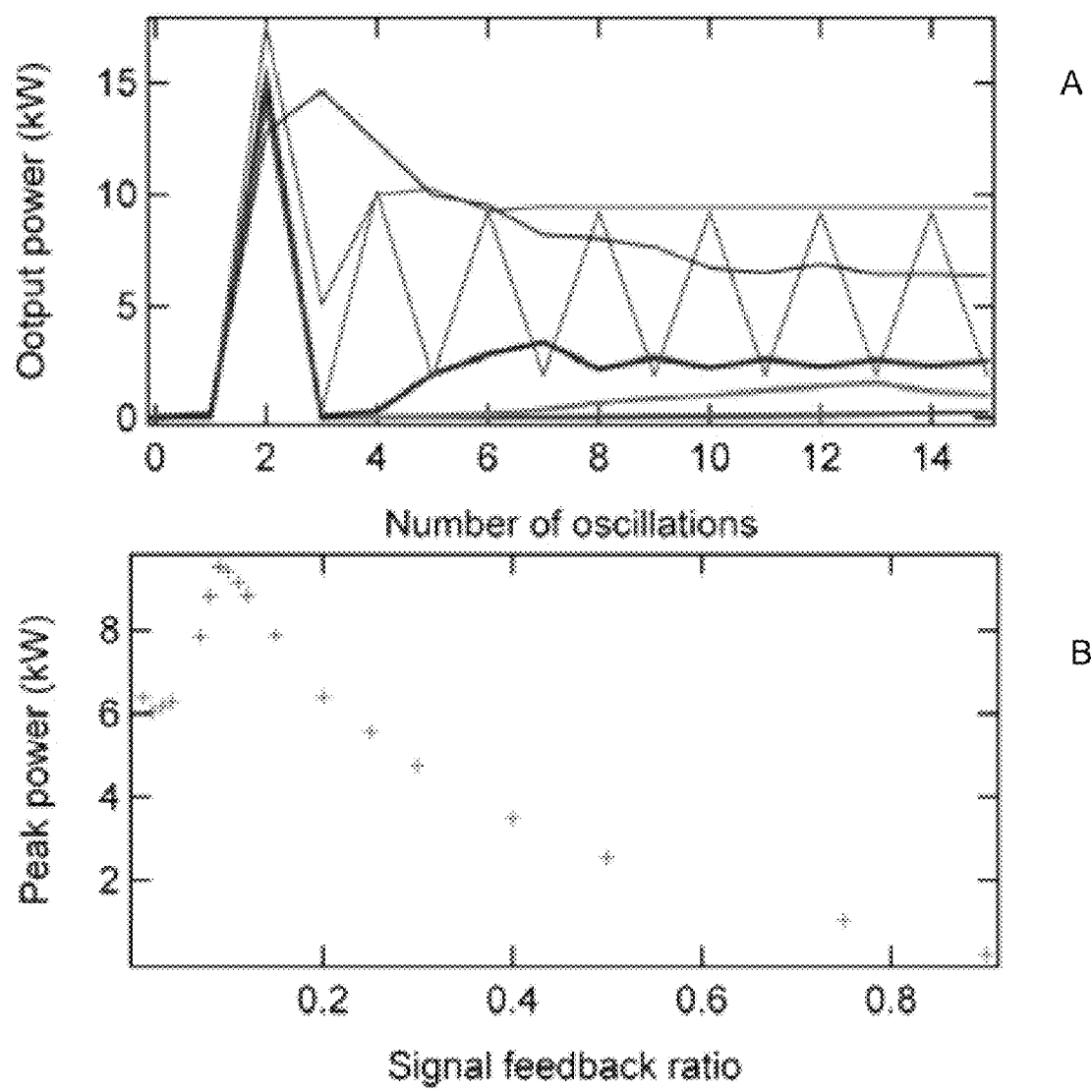
FIG. 11A plots of the output power as a function of number of oscillations a pulse undergoes as it builds up within the oscillator cavity according to an embodiment of the present invention.
FIG. 11B plots of the output power as a function of feedback ratio according to an embodiment of the present invention.

Preliminary simulation results shown in FIG. 11 indicate that the output power will be heavily affected by gain saturation and thus cavity feedback. FIG. 11A plots of the output power as a function of number of oscillations a pulse undergoes as it builds up within the oscillator cavity according to an embodiment of the present invention. Plots are for several different feedback ratios and they reveal stable convergence and unstable convergence towards an average output power. FIG. 11B plots of the output power as a function of feedback ratio according to an embodiment of the present invention. One can see that there is an optimum signal feedback ratio of roughly 9% for the simulation parameters that were chosen. 9% corresponds to a stable convergence point.

The cavity can be directly included through finite difference simulations of pulse evolution within a parametric oscillator. These simulations are for a 3 cm long fiber pumped by a mode-locked Yb-fiber laser with a peak power of 40 kW. The coupled output power is plotted as a function of the percentage of signal fed back into the cavity. One can see that the system generally converges to a particular power after several round trips, but that there are also situations where subsequent pulses will be of different output powers. In practice one can always align the system to obtain a stable pulse train because coupling efficiency is easily adjusted.

Figure 12A:
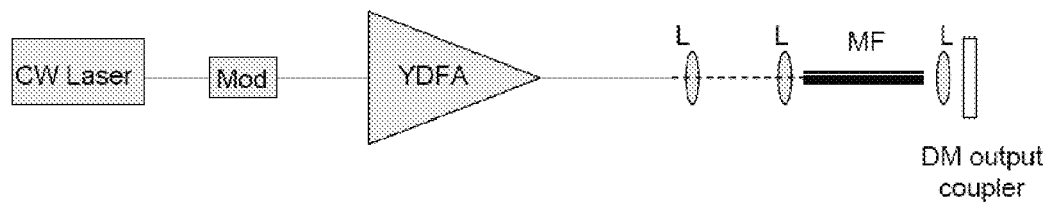
FIG. 12A shows a schematic of a simple fiber-based FOPO used to generate few-picoseconds pulses at a repetition rate of 50 MHz and average powers as high as 33 mW according to an embodiment of the present invention.

FIG. 12A shows a schematic of a simple fiber-based FOPO used to generate few-picoseconds pulses at a repetition rate of 50 MHz and average powers as high as 33 mW according to an embodiment of the present invention. The pump laser is a directly modulated and amplified CW laser. The FOPO is a Fabry-Perot cavity formed between the cleaved end of the MF and the output coupler. Embodiments provide a truly portable system capable of generating ultrafast laser pulses.

The natural pulse compression ability of this system implies that one can externally modulate a CW laser using state of the art modulators to generate pulses on the order of 20 ps in duration. After amplifying these pulses in a high-power fiber amplifier they can be directly introduced into a FOPO cavity using standard aspheric lenses. Cavity feedback is provided by the Fresnel-fiber reflection on one end of the Fabry-Perot cavity and a dichroic mirror output coupler on the other end. This should provide roughly 2%-4% feedback, which is not optimal according to our simulations, but should still provide stable operation at fairly high power levels. The wavelength is tuned by taking advantage of cavity dispersion and either translating the output coupler or changing the pump laser modulation frequency. Because the system can tolerate high loss within the cavity one can use MFs that have been spliced to standard fibers, and further fiber integration is possible. Assuming that the preliminary results scale to longer pulse durations, this system should be able to deliver few-ps pulses with greater than 30 mW of average power. The MF in this system is slightly less than 2-m in length, and several commercially available MFs can be used. In particular, the NL-1050-ZERO-2 fiber from Crystal-Fibre is a good candidate.

This system is an extremely flexible picosecond pulsed system that is portable, inexpensive to construct, and extends multiphoton biophotonics capability into the 1.3 μm wavelength range. An all-fiber system capable of generating few-ps pulses of narrow spectral bandwidth and with center wavelength tunability will have enormous commercial appeal to those in the biophotonics field.

Figure 12B:
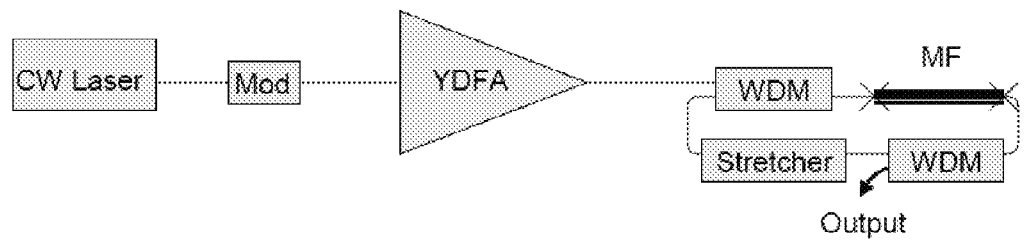
FIG. 12B shows a schematic of an all-fiber FOPO used to generate few-picoseconds pulses at a repetition rate of 100 MHz and average powers as high as 100 mW according to an embodiment of the present invention.

FIG. 12B shows a schematic of an all-fiber FOPO used to generate few-picosecond pulses at a repetition rate of 100 MHz and average powers as high as 100 mW according to an embodiment of the present invention. An alternative to the simple Fabry-Perot system is the ring configuration given in FIG. 12B. Standard wavelength division multiplexers designed for Ytterbium-doped fiber devices can be used for input and output coupling. The wavelength is tuned by taking advantage of cavity dispersion and using a fiber stretcher (several loops of optical fiber wrapped on a mandrel actuated by a piezoelectric stack) to vary the cavity length. Because the system can tolerate high loss within the cavity one can use MFs that have been spliced to standard fibers. Assuming that our preliminary results scale, this system should be able to deliver few-ps pulses with nearly 100 mW of average power. If successful, this system will represent an extremely flexible picosecond pulsed system that is portable and inexpensive to construct.

Figure 12C:
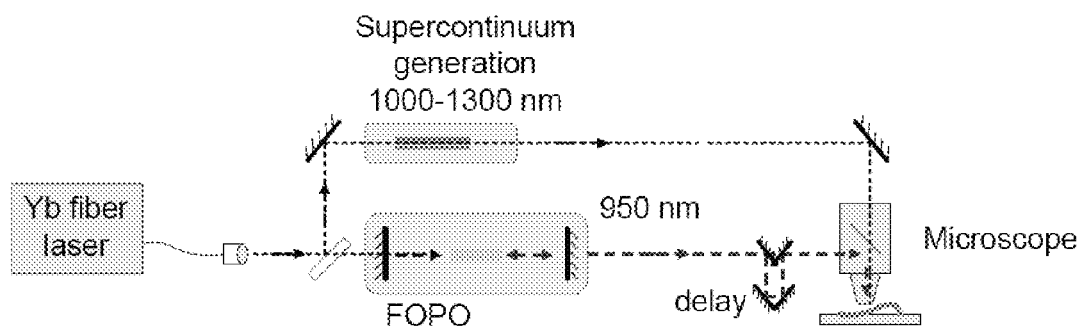
FIG. 12C shows a scheme for realizing broadband CARS measurements according to an embodiment of the present invention.

The wavelength-tunable outputs from a FOPO can be readily combined to perform CARS measurements as shown in FIG. 12C. The first experiment to be performed will be to utilize the current FOPO implementation as a pump for CARS measurements. The idea was suggested by researchers within the Biomaterials group at NIST, with whom I have collaborated on source development [liu08]. The basic idea is to implement a broadband CARS measurement where the light from a fiber laser is split into two portions: one part pumps a FOPO to generate a 950 nm pulse train; the second part drives a supercontinuum generation process [references] to deliver broadband light from roughly 1000 nm up to 1300 nm. After some filtering and pulse processing, these two fields are focused into a sample and the generated light is gathered in transmission and directed into a spectrometer for analysis (detection is not shown in the figure). In this configuration it is possible to obtain vibrational spectra over a bandwidth>2500 cm−1, in a single shot, covering the entire fingerprint region. Such broadband spectral coverage allows for identifying a larger number of chemically distinct species, giving broadband CARS potential for widespread applications in biological and materials imaging. Using the two outputs of the FOPO one can also perform a narrowband measurement of C-H stretching at roughly 3000 cm−1. These proof of principle experiments will validate that FOPOs generate enough power of suitable wavelength to be useful for such measurements.

Fluorescence microscopy using visible lasers for exciting the fluorophore is becoming a widely used technique for biological studies. The ability to express fluorescent proteins as markers for cellular processes suggests that the technique will continue to gain in popularity [i]. Exciting these fluorescent materials with visible lasers often results in considerable absorption of laser energy within the cell, which can perturb the experiment or lead to cell death. Biologists have turned to multi-photon processes wherein an intensity dependent absorption process leads to absorption localized at the focal region of the laser beam. Multi-photon absorption processes also benefit from the use of pulsed rather than continuous wave sources, and so FOPOs can serve a valuable purpose.

Armed with the lessons learned from our CARS experiments, we will implement a fiber-integrated FOPO for use with a confocal microscope. Initially we will excite fluorescence using the fiber laser that serves as the pump for our FOPO. By using the laser itself we can operate with a huge power budget and debug the fluorescence detection apparatus. We will then use the output from the FOPO as a source for exciting the fluorophore. Finally, we will use the wavelength tunability provided by our FOPO to selectively probe multiple fluorescent markers with different absorption/emission wavelengths. The final step in the fluorescence microscopy study will be to explore fiber delivery of the excitation light to the microscope.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All references, applications, and patents cited above are herein incorporated by reference in their entirety for all purposes. None is admitted to be prior art.

What is claimed is:

1. A fiber-based optical parametric oscillator comprising:
   a fiber-based gain medium operable to receive a pump beam of electromagnetic radiation, wherein the fiber-based gain medium has a length of 10 cm or less;
   a first optical device between a source of the pump beam and the fiber-based gain medium; and
   a second optical device after the fiber-based gain medium, wherein each optical device transmits and reflects certain wavelengths, wherein at least a portion of the reflected wavelengths oscillate between the two optical devices, and wherein the fiber-based gain medium is the entirety of a fiber between the two optical devices.

2. The fiber-based optical parametric oscillator of claim 1, wherein the fiber is generally of tubular shape and has about the same diameter from one end of the fiber to the other end of the fiber.

3. The fiber-based optical parametric oscillator of claim 1, wherein the fiber-based gain medium comprises a microstructure fiber.

4. The fiber-based optical parametric oscillator of claim 1, wherein the fiber-based medium has a length between 10 cm and 1 mm.

5. The fiber-based optical parametric oscillator of claim 1, wherein the second optical device transmits the conjugate field of the fiber-based gain medium as the output beam.

6. The fiber-based optical parametric oscillator of claim 1, wherein an output beam transmitted through the second optical device has a wavelength range of at least 200 nm.

7. A fiber-based optical parametric oscillator comprising:
   a fiber-based gain medium operable to receive a pump beam of electromagnetic radiation, wherein the fiber-based gain medium has a length of 10 cm or less and has a diameter of 3 to 5 microns;
   a first optical device between a source of the pump beam and the fiber-based gain medium; and
   a second optical device after the fiber-based medium, wherein each optical device transmits and reflects certain wavelengths, and wherein at least a portion of the reflected wavelengths oscillate between the two optical devices.

8. The fiber-based optical parametric oscillator of claim 7, wherein the fiber is generally of tubular shape and has the same diameter from one end of the fiber to the other end of the fiber.

9. The fiber-based optical parametric oscillator of claim 7, wherein the fiber-based gain medium has a length between 2 cm and 4 cm.

10. The fiber-based optical parametric oscillator of claim 7, wherein the fiber-based gain medium has a diameter of about 4 microns.

11. The fiber-based optical parametric oscillator of claim 7, wherein the pump beam received by the fiber-based gain medium consists of electromagnetic radiation having one or more wavelengths that are between 1020 nm and 1100 nm.

12. The fiber-based optical parametric oscillator of claim 11, further comprising;
a source that produces the pump beam, wherein the source is an Ytterbium doped laser.

13. The fiber-based optical parametric oscillator of claim 11, wherein an output beam transmitted from the fiber-based gain medium has a wavelength range of at least 900 nm to 1200 nm.

14. The fiber-based optical parametric oscillator of claim 13, wherein the output beam has a wavelength range of 700 nm or 1400 nm.

15. The fiber-based optical parametric oscillator of claim 13, wherein the output beam has pulses having a width of 200 femtoseconds or less.

16. The fiber-based optical parametric oscillator of claim 13, wherein the output beam has pulses with an energy of at least 1 nJ.

17. The fiber-based optical parametric oscillator of claim 16, wherein the output beam has a power of at least 200 mW.

18. A fiber-based optical parametric oscillator comprising:
a fiber-based gain medium operable to receive a pump beam of electromagnetic radiation, wherein the fiber-based gain medium has a length of 10 cm or less;
a first optical device between a source of the pump beam and the fiber-based gain medium; and
a second optical device after the fiber-based gain medium, wherein the first and second optical devices transmit and reflect certain wavelengths of electromagnetic radiation, wherein the fiber-based gain medium is the entirety of a fiber between the two optical devices, and
wherein the second optical device is positioned to receive electromagnetic radiation transmitted through the fiber-based gain medium and to reflect a first set of certain wavelengths back through the fiber-based gain medium to the first optical device, and wherein the first optical device is positioned to reflect the first set of certain wavelengths back to the second optical device through the fiber-based gain medium.

19. The fiber-based optical parametric oscillator of claim 18, wherein the second optical device transmits the conjugate field of the fiber-based gain medium as the output beam.

20. The fiber-based optical parametric oscillator of claim 18, wherein an output beam transmitted through the second optical device has a wavelength range of at least 200 nm.

* * * * *